United States Patent [19]

Bukac et al.

[11] 3,992,361

[45] Nov. 16, 1976

[54] METHOD FOR PRODUCING ANIONIC POLYAMIDES WITH CHEMICALLY BONDED DYE

[75] Inventors: Zbynek Bukac; Jan Sebenda, both of Prague, Czechoslovakia

[73] Assignee: Ceskoslovenska akademie ved, Prague, Czechoslovakia

[22] Filed: Jan. 16, 1975

[21] Appl. No.: 541,618

Related U.S. Application Data

[63] Continuation-in-part of Ser. No. 500,057, Aug. 23, 1974, abandoned.

[30] Foreign Application Priority Data

Aug. 29, 1973 Czechoslovakia .................. 6009/73

[52] U.S. Cl. ............................ 260/78 L; 260/37 N; 260/78 P
[51] Int. Cl.² .................. C08G 69/20; C08G 69/24
[58] Field of Search................ 260/78 L, 78 P, 37 N

[56] References Cited
UNITED STATES PATENTS

| | | | |
|---|---|---|---|
| 3,448,085 | 6/1969 | Pietrusza et al. .................. | 260/78 L |
| 3,639,360 | 2/1972 | Bukac et al. ...................... | 260/78 L |

*Primary Examiner*—Lucille M. Phynes

[57] ABSTRACT

The invention relates to a method for manufacturing anionic polyamies, copolyamides and lactam oligomers with a chemically bonded dye. The dyes are of the general formula

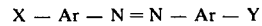

$$X - Ar - N = N - Ar - Y$$

wherein Ar is aromatic nucleus, Y is X, H, alkyl, alkoxy, aralkyl or dialkylamino and X is the group

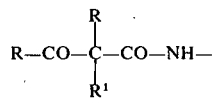

wherein R is alkyl, cycloalkyl, aryl or aralkyl and R¹ is R or H. The dye materials are used as effective cocatalysts for providing thermally stable coloring in the anionic polymerization of lactams giving rise to polyamides containing almost 100% of the original color absorption.

4 Claims, No Drawings

METHOD FOR PRODUCING ANIONIC POLYAMIDES WITH CHEMICALLY BONDED DYE

RELATED APPLICATION

This application is a continuation-in-part of the now abandoned application Ser. No. 500,057, filed on Aug. 23, 1974, the benefit of which filing date is claimed, and which disclosure is incorporated herein.

This invention relates to a method for producing anionic polyamides, copolyamides and lactam oligomers with a chemically bonded dye and to the products thusly produced.

In the production of colored polyamides, the dyes most commonly employed have been fixed to the material by sorption forces, these forces, however, have only limited strength. There are some methods available for enhancing this strength, however, any improvement achieved only approaches the strength of the chemical bond providing the link of the dye molecule to the polyamide chain. Anchoring of the dye directly to a macromolecule is a highly desired method for industrial dyeing of the polyamide material. It is limited however in the case of anionic polyamides to such compounds, which will exhibit a minimum influence upon the very sensitive production procedure and which will at the same time be stable in a strongly alkaline polymerization medium. As an example of this type of dyeing of anionic polyamides, attention is directed to U.S. Pat. No. 3,448,085, which teaches the use of compounds serving as co-catalysts and, at the same time, as dyes operative to be fixed to the polyamide. These compounds, however, have only a very low co-catalytic effect, which is the main disadvantage of that method. According to U.S. Pat. No. 3,639,360, dyes of the Hansa Yellow type may be used which also act as dyes and co-catalysts for the anionic polymerization. Their co-catalytic effect is substantially greater than that of the aforesaid compounds and, therefore, they may be employed in most technologies requiring the anionic polyamide. A certain disadvantage of the application of the Hansa Yellows is their relatively low color stability at higher temperatures, the latter bringing about substantial degradation of the dye in some production methods, e.g., in the continuous manufacture of anionic polyamides. The application of dispersion dyes in anionic polymerization is complicated by sedimentation of the dye in a low-viscous melt of the lactam.

It is accordingly an object of the instant invention to avoid the drawbacks of the prior art.

It is another object of the invention to provide for an improved method for producing anionic polyamides with chemically bonded dye.

These and other objects of the invention will become more apparent from the following detailed disclosure and claims.

Broadly speaking, the invention includes the provision of a colored polyamide having a dye chemically bound therein produced by polymerization of lactams in the presence of at least one colored co-catalyst having the formula X - Ar - N = N - Ar - Y wherein Ar is aryl having 1 to 3 benzene rings, Y is X, H, $C_{1-6}$ alkyl, $C_{1-6}$ alkoxy, aralkyl having 1 to 6 carbon atoms in the alkyl moiety, or di lower $C_{1-6}$ alkylamino, X is

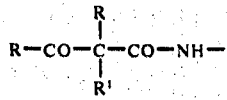

wherein R is a $C_{1-18}$ alkyl, cycloalkyl having 5 to 6 carbon atoms in the ring, an aryl having 1 or 2 benzene rings, or aralkyl having 1 or 2 carbon atoms in the alkyl moiety and $R^1$ is R as above defined or H.

More specifically, the invention contemplates the advantageous carrying out of the anionic polymerization of the lactams in the presence of at least one colored co-catalyst of the general formula X - Ar - N = N - Ar - Y wherein Ar may be substituted or unsubstituted aromatic nucleus having one to three benzene rings selected from the group of aryls consisting of phenyline and naphthylene. Y is H, X $C_{4-6}$ alkyl, lower alkoxy having 1 to 6 carbon atoms, lower aralkyl having 1 to 6 carbon atoms in the alkyl moiety, lower dialkylamino where in alkyl is lower alkyl of 1 to 6 carbon atoms, and X is a group of the formula

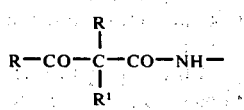

wherein R represents alkyl having 1 to 18 carbon atoms, cycloalkyl having 5 to 6 carbon atoms in the ring, an aryl as defined having 1 or 2 benzene rings, aralkyl having 1 or 2 carbon atoms in the alkyl moiety and $R^1$ is R as above defined or H.

A substantial advantage of these dyes in addition to their higher co-catalytic effect particularly as compared to the prior art for instance U.S. Pat. No. 3,639,360 is their higher thermal stability and the exhibition of a high degree of "building-in", as is shown in the following Examples.

Additionally, low-molecular-weight polymers and oligomers of lactams as well as copolymers of various lactams can be prepared by the here in-described method. Especially advantageous is the almost 100% "building-in" of the dye component in the new procedure, which can be utilized in the preparation of special colored oligomers which can then serve as substantially non-extractable dyes. The colored co-catalysts (activators) may be readily prepared for instance by treatment of aminoazo compounds with diketenes using a method analogous to that described in the literature (Hasek et al, J. Org. Chem. 26 4340/1961), the entire disclosure of which is incorporated herein by reference. It should be noted that neither the preparation of the polymeric precursor (lactam) material nor the preparation of the colored co-catalyst per se, is an essential part of this invention; they each may separately be prepared by methods well known in the art. Almost all of the suitably prepared colored co-catalysts may be used in the performance of the instant invention.

In carrying out the procedure of the invention for the preparation of the colored polymers from the precursor materials, the following is preferred. The precursor materials are advantageously mixed together using procedures and equipment well known in the art. Preferably a salt of the lactam is dissolved in the lactam. The salt is prepared by known methods and is preferably an alkali metal salt thereof in the art. The dissolution of the salt may be carried out at temperatures of about 50° C to 180° C, preferably about 80° to 120° C. The medium employed for the dissolution as aforesaid is preferably a liquid mixture or solution of the lactam per se. Other suitable liquids which may be employed in admixture therewith if desired include silicone oil, dialkyl amides and dimethylsulfoxide. The ratio or weight percentage of lactam salt to lactam is substantially non-critical and may vary from about 0.1 to 5 mole % salt per 30 to 100 lactam solution and is preferably about 0.2 to 1 mol % salt. After suitably dissolving the salt, at least one colored co-catalyst is admixed therewith and polymerization effected at temperatures of about 80° to 270° C, preferably of about 160° to 230° C. In a preferred procedure the colored co-catalyst is added to the solution containing the lactam and lactam salt. Where more than one colored co-catalyst is employed, the ratio of one to the other is about 5 to 0.5, preferably about 2 to 1. The colored co-catalyst is employed together with the polymerization catalyst for the lactam. The ratio of one to the other is about 0.2 to 5, preferably to 80%.

The foregoing polymerization initiator per se, forms no essential part of the invention, albeit, that it must be present to effectuate the reaction.

It should be noted that the colored polyamides may be used as such or fibers, films, filaments or the like may be produced therefrom by means known in the art.

The following Examples are presented for the purpose of illustrating the invention and are not to be considered as a limitation thereof. All parts, proportions and ratios therein as well as in the appended claims are by weight unless otherwise indicated.

EXAMPLE 1

Sodium caprolactamate is prepared from sodium tert. butoxide and dissolved in caprolactam in the amount of 0.3 mol %. 0.3 Mol % of 2,2,4-trimethyl-3-oxopentanoyl-(4'-phenylazo)aniline is dissolved in the solution thus obtained. The polymerization product containing 89.5% of the colored polyamide is obtained after heating to 180° C for 15 minutes; the polyamide contains 100% of the dye incorporated therein. Even if the polymerization is carried out for 60 minutes, 96.5% of the polymer is formed which exhibits over 90% of the original color absorption. On the contrary, if 2-benzoyl-2-(4'-dimethylaminophenylazo)-acetanilide is used (a dye of the Hansa Yellow type), only 10–20% of the original color absorption remains in the polymer under the same conditions.

EXAMPLE 2

A polymerization product containing about 96% of the colored polyamide which exhibits 91% of the original color absorption is obtained by polymerization of caprolactam in the presence of 0.4% of sodium caprolactamate and 0.3% of N-(1-naphthylazo)-2,2,4-trimethyl-3-oxopentaneanilide at 190° C for 60 minutes.

EXAMPLE 3

The same catalytic components in the same concentrations as in Example 1 are used in the polymerization of dodecanolactam at 200° C. Poly(dodecanolactam) is obtained in a yield of 98% and the resulting polymer exhibits 85% of the original color absorption.

EXAMPLE 4

Sodium dodecanolactamate (0.003 mol) and N-(4-dimethylaminophenylazo)-2,2,4-trimethyl-3-oxopentanoylaniline are dissolved in 1 mol of dodecanolactam. The polymerization product obtained after heating this polymerization mixture to 190°–200° C for 60 minutes contains 98% of polydodecanolactam. The dye cannot be extracted from this polymer either with water or alcohol.

EXAMPLE 5

Colored polycaprolactam with firmly incorporated dye therein is obtained with analogous results to that shown in Example 1, when N-(4-dimethylaminophenylazo)-2-methyl-2-ethyl-3-oxohexanoylaniline is used as an activator in the same concentration.

EXAMPLE 6

Colored copolyamide is obtained by copolymerization of a mixture containing 20 wt. % of dodecanolactam, 5 wt. % of capryllactam and 75 wt. % of caprolactam or 10 wt. % of α-methyl-caprolactam and 90 wt. % of caprolactam using the same polymerization conditions as set out in Example 4.

EXAMPLE 7

Colored oligomers suitable for the dyeing of polyamides or other polar polymers are prepared by polymerization of 1 mol of caprolactam in the presence of 0.1 mol of sodium or lithium caprolactamate and 0.1 mole of N-(4-phenylazo)-anilide of 2,2,4-trimethyl-3-oxovaleric acid at 180° C for 60 minutes. Co-oligomers are obtained analogously by copolymerization of a mixture consisting of 25% of dodecanolactam and 75% of a caprolactam or of 15% of capryllactam and 85% of caprolactam or of 10% of C-methylcaprolactam and 90% of caprolactam using 10–15 mol % of the same colored activator.

EXAMPLE 8

Colored polycaprolactam is obtained similarly as in Example 2, if 0.2 mol % of N-(4-methoxyphenylazo)-2,2,4-trimethyl-3-oxopentananilide and 0.1 mol % of N-(4-methyl-phenylazo)-2,2,4-trimethyl-3-oxopentananilide are used as activators.

EXAMPLE 9

Colored oligomers are formed analogously to Example 7, if a mixture consisting of 0.2 mol of N-phenylazoanilide of 2-ethyl-3-oxohexanoic acid and 0.9 mol of N-phenylazoanilide of 2,2,4-trimethyl-3-oxopentanoic acid is used as the activator.

Although this invention has been described with reference to specific Examples, it will be apparent to one skilled in the art that various modifications may be made thereto which fall within its scope.

We claim:

1. A colored polyamide having a dye chemically bound therein produced by polymerization of lactams in the presence of at least one colored co-catalyst having the formula

wherein Ar is an aryl having 1 to 3 benzene rings selected from the group consisting of phenylene and naphthylene, Y is X, H, $C_{1-6}$ alkyl, $C_{1-6}$ alkoxy, aralkyl having 1 to 6 carbon atoms in the alkyl moiety or di lower $C_{1-5}$ alkylamino, X is

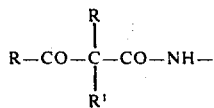

wherein R is $C_{1-18}$ alkyl, cycloalkyl having 5 to 6 carbon atoms in the ring, an aryl as above defined having 1 or 2 benzene rings, or aralkyl having 1 or 2 carbon atoms in the alkyl moiety and $R^1$ is R as above defined or H.

2. The polyamide as defined in claim 1 wherein the ratio of said colored co-catalyst to said initiator is about 500 to 50%.

3. The polyamide as defined in claim 2 produced by anionic polymerization.

4. An article in the form of a film, fiber or filament containing a color fast polyamide as set forth in claim 1.

* * * * *